(12) United States Patent
Opshaug et al.

(10) Patent No.: US 8,682,341 B1
(45) Date of Patent: Mar. 25, 2014

(54) BLIND IDENTIFICATION OF SINGLE-FREQUENCY-NETWORK TRANSMITTERS

(75) Inventors: Guttorm Opshaug, Menlo Park, CA (US); Matthew Rabinowitz, Portola Valley, CA (US); Scott Furman, Menlo Park, CA (US)

(73) Assignee: TruePosition, Inc., Berwyn, PA (US)

( * ) Notice: Subject to any disclaimer, the term of this patent is extended or adjusted under 35 U.S.C. 154(b) by 1582 days.

(21) Appl. No.: 11/865,881

(22) Filed: Oct. 2, 2007

Related U.S. Application Data

(60) Provisional application No. 60/866,886, filed on Nov. 22, 2006.

(51) Int. Cl.
*H04W 24/00* (2009.01)

(52) U.S. Cl.
USPC ............... 455/456.1; 455/456.6; 342/464; 342/450

(58) Field of Classification Search
CPC .................................................. H04W 64/00
USPC ............. 455/456.1, 456.6; 342/464, 450
See application file for complete search history.

(56) References Cited

U.S. PATENT DOCUMENTS

| | | |
|---|---|---|
| 4,555,707 A | 11/1985 | Connelly |
| 4,652,884 A | 3/1987 | Starker |
| 4,700,306 A | 10/1987 | Wallmander |
| 4,894,662 A | 1/1990 | Counselman |
| 5,045,861 A | 9/1991 | Duffett-Smith |
| 5,157,686 A | 10/1992 | Omura et al. |
| 5,166,952 A | 11/1992 | Omura et al. |
| 5,271,034 A | 12/1993 | Abaunza |
| 5,323,322 A | 6/1994 | Mueller et al. |
| 5,398,034 A | 3/1995 | Spilker, Jr. |
| 5,481,316 A | 1/1996 | Patel |
| 5,504,492 A | 4/1996 | Class et al. |
| 5,510,801 A | 4/1996 | Engelbrecht et al. |
| 5,604,765 A | 2/1997 | Bruno et al. |
| 5,630,206 A | 5/1997 | Urban et al. |

(Continued)

FOREIGN PATENT DOCUMENTS

| | | |
|---|---|---|
| DE | 3242997 A1 | 5/1984 |
| EP | 58129277 | 8/1983 |
| GB | 2 222 922 A | 3/1990 |
| GB | 2 254 508 A | 10/1992 |

OTHER PUBLICATIONS

Parkinson, B.W., et al., "Autonomous GPS Integrity Monitoring Using the Pseudorange Residual," *Journal of the Institute of Navigation* (1988), vol. 35, No. 2, pp. 255-274.

(Continued)

*Primary Examiner* — Olumide T Ajibade Akonai
*Assistant Examiner* — Michael Irace
(74) *Attorney, Agent, or Firm* — Baker & Hostetler LLP

(57) ABSTRACT

Apparatus having corresponding methods and computer-readable media comprise: an input module adapted to receive a plurality of pseudoranges each determined by a receiver based on one of a plurality of wireless single-frequency network (SFN) signals transmitted at a predetermined frequency from a corresponding plurality of transmitters; and a transmitter identification module adapted to identify one of the transmitters for each of the pseudoranges based on the pseudoranges and a plurality of ranges each predetermined between one of the transmitters and one of a plurality of predetermined geographic locations.

16 Claims, 4 Drawing Sheets

(56) References Cited

U.S. PATENT DOCUMENTS

| | | | |
|---|---|---|---|
| 5,648,982 A | 7/1997 | Durrant et al. |
| 5,774,829 A | 6/1998 | Cisneros et al. |
| 5,784,339 A | 7/1998 | Woodsum et al. |
| 5,835,060 A | 11/1998 | Czarnecki et al. |
| 5,920,284 A | 7/1999 | Victor |
| 5,952,958 A | 9/1999 | Speasl et al. |
| 5,953,311 A | 9/1999 | Davies et al. |
| 6,006,097 A | 12/1999 | Hornfeldt et al. |
| 6,016,119 A | 1/2000 | Krasner |
| 6,078,284 A | 6/2000 | Levanon |
| 6,094,168 A | 7/2000 | Duffett-Smith et al. |
| 6,107,959 A | 8/2000 | Levanon |
| 6,137,441 A | 10/2000 | Dai et al. |
| 6,144,413 A | 11/2000 | Zatsman |
| 6,147,642 A | 11/2000 | Perry et al. |
| 6,181,921 B1 | 1/2001 | Konisi et al. |
| 6,184,921 B1 | 2/2001 | Limberg |
| 6,201,497 B1 | 3/2001 | Snyder et al. |
| 6,215,778 B1 | 4/2001 | Lomp et al. |
| 6,289,280 B1 | 9/2001 | Fernandez-Corbaton et al. |
| 6,317,452 B1 | 11/2001 | Durrant et al. |
| 6,317,500 B1 | 11/2001 | Murphy |
| 6,373,432 B1 | 4/2002 | Rabinowitz et al. |
| 6,374,177 B1 | 4/2002 | Lee et al. |
| 6,400,753 B1 | 6/2002 | Kohli et al. |
| 6,433,740 B1 | 8/2002 | Gilhousen |
| 6,437,832 B1 | 8/2002 | Grabb et al. |
| 6,484,034 B1 | 11/2002 | Tsunehara et al. |
| 6,522,297 B1 | 2/2003 | Rabinowitz et al. |
| 6,559,800 B2 | 5/2003 | Rabinowitz et al. |
| 6,559,894 B2 | 5/2003 | Omura et al. |
| 6,590,529 B2 | 7/2003 | Schwoegler |
| 6,646,603 B2 | 11/2003 | Dooley et al. |
| 6,717,547 B2 | 4/2004 | Spilker, Jr. et al. |
| 6,727,847 B2 | 4/2004 | Rabinowitz et al. |
| 6,753,812 B2 | 6/2004 | Rabinowitz et al. |
| 6,806,830 B2 | 10/2004 | Panasik et al. |
| 6,839,024 B2 | 1/2005 | Spilker, Jr. et al. |
| 6,859,173 B2 | 2/2005 | Spilker, Jr. et al. |
| 6,861,984 B2 | 3/2005 | Rabinowitz et al. |
| 6,879,286 B2 | 4/2005 | Rabinowitz et al. |
| 6,914,560 B2 | 7/2005 | Spilker, Jr. et al. |
| 6,917,328 B2 | 7/2005 | Rabinowitz et al. |
| 6,937,866 B2 | 8/2005 | Duffett-Smith et al. |
| 6,952,182 B2 | 10/2005 | Spilker, Jr. et al. |
| 6,961,020 B2 | 11/2005 | Robinowitz et al. |
| 6,963,306 B2 | 11/2005 | Spilker, Jr. et al. |
| 6,970,132 B2 | 11/2005 | Spilker, Jr. et al. |
| 7,042,396 B2 | 5/2006 | Omura et al. |
| 7,042,949 B1 | 5/2006 | Omura et al. |
| 7,126,536 B2 | 10/2006 | Rabinowitz et al. |
| 7,260,378 B2 | 8/2007 | Holland et al. |
| 7,269,424 B2 | 9/2007 | Camp, Jr. |
| 7,372,405 B2 | 5/2008 | Rabinowitz et al. |
| 7,463,195 B2 | 12/2008 | Rabinowitz et al. |
| 2002/0122003 A1 | 9/2002 | Patwari et al. |
| 2002/0184653 A1 | 12/2002 | Pierce et al. |
| 2002/0199196 A1 | 12/2002 | Rabinowitz et al. |
| 2003/0162547 A1 | 8/2003 | McNair |
| 2004/0073914 A1 | 4/2004 | Spilker et al. |
| 2004/0157622 A1* | 8/2004 | Needham .................. 455/456.1 |
| 2004/0201779 A1 | 10/2004 | Spilker et al. |
| 2005/0066373 A1* | 3/2005 | Rabinowitz et al. .......... 725/131 |
| 2005/0251844 A1 | 11/2005 | Martone et al. |
| 2007/0050824 A1 | 3/2007 | Lee et al. |
| 2007/0109184 A1* | 5/2007 | Shyr et al. ................ 342/357.06 |
| 2007/0121555 A1 | 5/2007 | Burgess et al. |
| 2007/0131079 A1 | 6/2007 | Opshaug et al. |
| 2007/0182633 A1 | 8/2007 | Omura et al. |
| 2007/0296632 A1 | 12/2007 | Opshaug et al. |

OTHER PUBLICATIONS

Rabinowitz, M., "A Differential Carrier Phase Navigation System Combining GPS with Low Earth Orbit Satellites for Rapid Resolution of Integer Cycle Ambiguities," *PhD Thesis for Department of Electrical Engineering, Stanford University* (Dec. 2000), pp. 59-73.

Spilker, Jr., J.J., "Fundamentals of Signal Tracking Theory," *Global Positioning System: Theory and Applications* (1994), vol. 1, Chapter 7, pp. 245-327.

Van Dierendock, A.J., "GPS Receivers," *Global Positioning System: Theory and Applications* (1995), vol. 1, Chapter 8, pp. 329-407.

Li, X., et al., "Indoor Geolocation Using OFDM Signals in HIPERLAN/2 Wireless LANS," 11$^{th}$ IEEE International Symposium on Personal Indoor and Mobile Radio Communications, PIMRC 2000, Proceedings (Cat. No. 00TH8525), Proceedings of 11$^{th}$ International Symposium on Personal Indoor and Mobile Radio Communication, London, UK, Sep. 18-21, pp. 1449-1453, vol. 2, XPO10520871, 2000, Piscataway, NJ, USA, IEEE, USA, ISBN; 9-7803-6463-5, Chapter I and III.

Rabinowitz, M., et al., "Positioning Using the ATSC Digital Television Signal," Rosum whitepaper, Online! 2001, XP002235053, Retrieved from the Internet on Mar. 13, 2003 at URL www.rosum.com/whitepaper 8-7-01.pdf.

U.S. Appl. No. 12/476,992, Do, et al.
U.S. Appl. No. 12/209,971, filed Sep. 12, 2008, Do, et al.
U.S. Appl. No. 12/333,445, filed Dec. 12, 2008, Rubin, et al.
U.S. Appl. No. 12/351,841, filed Jan. 11, 2009, Lee, et al.
U.S. Appl. No. 12/263,731, Rabinowitz, et al.
U.S. Appl. No. 10/008,613, Pierce, et al.
U.S. Appl. No. 11/380,691, Metzler, et al.
U.S. Appl. No. 11/535,485, Furman, et al.
U.S. Appl. No. 11/622,838, Rabinowitz, et al.
U.S. Appl. No. 11/770,162, Furman, et al.
U.S. Appl. No. 12/117,676, Rabinowitz, et al.
U.S. Appl. No. 12/168,141, Furman, et al.

\* cited by examiner

BLIND IDENTIFICATION OF SINGLE-FREQUENCY-NETWORK TRANSMITTERS

CROSS-REFERENCE TO RELATED APPLICATIONS

This application claims benefit of U.S. Provisional Patent Application Ser. No. 60/866,886 filed Nov. 22, 2006, the disclosure of which is incorporated by reference herein in its entirety.

BACKGROUND

The present invention relates generally to single-frequency networks. More particularly, the present invention relates to blind identification of single-frequency-network transmitters.

In many conventional broadcast transmission systems, a transmitter can be identified based on the signal it transmits. For example, in a frequency-division multiple access (FDMA) broadcast television (TV) network, individual TV channels can be identified by their transmit frequencies, and linked to their corresponding points of broadcast.

In contrast, single-frequency networks (SFN) transmit virtually identical signals from multiple points of transmission. Broadcasts from the various transmitters are generally synchronized, for example by GPS, to within tens of nanoseconds. While this type of macro-scale diversity has shown great merit in combating fading, in terms of positioning this method poses a significant problem in that an SFN signal does not identify its transmitter.

SUMMARY

In general, in one aspect, the invention features an apparatus comprising: an input module adapted to receive a plurality of pseudoranges each determined by a receiver based on one of a plurality of wireless single-frequency network (SFN) signals transmitted at a predetermined frequency from a corresponding plurality of transmitters; and a transmitter identification module adapted to identify one of the transmitters for each of the pseudoranges based on the pseudoranges and a plurality of ranges each predetermined between one of the transmitters and one of a plurality of predetermined geographic locations.

In some embodiments, the transmitter identification module comprises: an error module adapted to generate an error for each of the geographic locations based on the ranges for the respective geographic locations and the pseudoranges; wherein the transmitter identification module identifies the transmitters based on the errors. Some embodiments comprise a location module adapted to determine a location of the receiver based on locations of the transmitters identified by the transmitter identification module and the pseudoranges. In some embodiments, the transmitter identification module selects a subset of the predetermined geographic locations based on one or more non-SFN signals received by the receiver; and the transmitter identification module identifies the transmitters based on the pseudoranges, the subset of the predetermined geographic locations, and the ranges corresponding to the subset of the predetermined geographic locations. Some embodiments comprise the receiver.

In general, in one aspect, the invention features an apparatus comprising: input means for receiving a plurality of pseudoranges each determined by a receiver based on one of a plurality of wireless single-frequency network (SFN) signals transmitted at a predetermined frequency from a corresponding plurality of transmitters; and transmitter identification means for identifying one of the transmitters for each of the pseudoranges based on the pseudoranges and a plurality of ranges each predetermined between one of the transmitters and one of a plurality of predetermined geographic locations.

In some embodiments, the transmitter identification means comprises: error means for generating an error for each of the geographic locations based on the ranges for the respective geographic locations and the pseudoranges; wherein the transmitter identification means identifies the transmitters based on the errors. Some embodiments comprise location means for determining a location of the receiver based on locations of the transmitters identified by the transmitter identification means and the pseudoranges. In some embodiments, the transmitter identification means selects a subset of the predetermined geographic locations based on one or more non-SFN signals received by the receiver; and the transmitter identification means identifies the transmitters based on the pseudoranges, the subset of the predetermined geographic locations, and the ranges corresponding to the subset of the predetermined geographic locations. Some embodiments comprise the receiver.

In general, in one aspect, the invention features a method comprising: receiving a plurality of pseudoranges each determined by a receiver based on one of a plurality of wireless single-frequency network (SFN) signals transmitted at a predetermined frequency from a corresponding plurality of transmitters; and identifying one of the transmitters for each of the pseudoranges based on the pseudoranges and a plurality of ranges each predetermined between one of the transmitters and one of a plurality of predetermined geographic locations.

Some embodiments comprise generating an error for each of the geographic locations based on the ranges for the respective geographic locations and the pseudoranges; wherein the transmitters are identified based on the errors. Some embodiments comprise determining a location of the receiver based on locations of the transmitters and the pseudoranges. Some embodiments comprise selecting a subset of the predetermined geographic locations based on one or more non-SFN signals received by the receiver; and identifying the transmitters based on the pseudoranges, the subset of the predetermined geographic locations, and the ranges corresponding to the subset of the predetermined geographic locations. Some embodiments comprise receiving the wireless SFN signals.

In general, in one aspect, the invention features computer-readable media embodying instructions executable by a computer to perform a method comprising: receiving a plurality of pseudoranges each determined by a receiver based on one of a plurality of wireless single-frequency network (SFN) signals transmitted at a predetermined frequency from a corresponding plurality of transmitters; and identifying one of the transmitters for each of the pseudoranges based on the pseudoranges and a plurality of ranges each predetermined between one of the transmitters and one of a plurality of predetermined geographic locations.

In some embodiments, the method further comprises: generating an error for each of the geographic locations based on the ranges for the respective geographic locations and the pseudoranges; wherein the transmitters are identified based on the errors. In some embodiments, the method further comprises: determining a location of the receiver based on locations of the transmitters and the pseudoranges. In some embodiments, the method further comprises: selecting a subset of the predetermined geographic locations based on one or more non-SFN signals received by the receiver; and identifying the transmitters based on the pseudoranges, the subset of the predetermined geographic locations, and the ranges corresponding to the subset of the predetermined geographic locations. In some embodiments, the method further comprises: receiving the wireless SFN signals.

The details of one or more implementations are set forth in the accompanying drawings and the description below. Other features will be apparent from the description and drawings, and from the claims.

Figure 1:
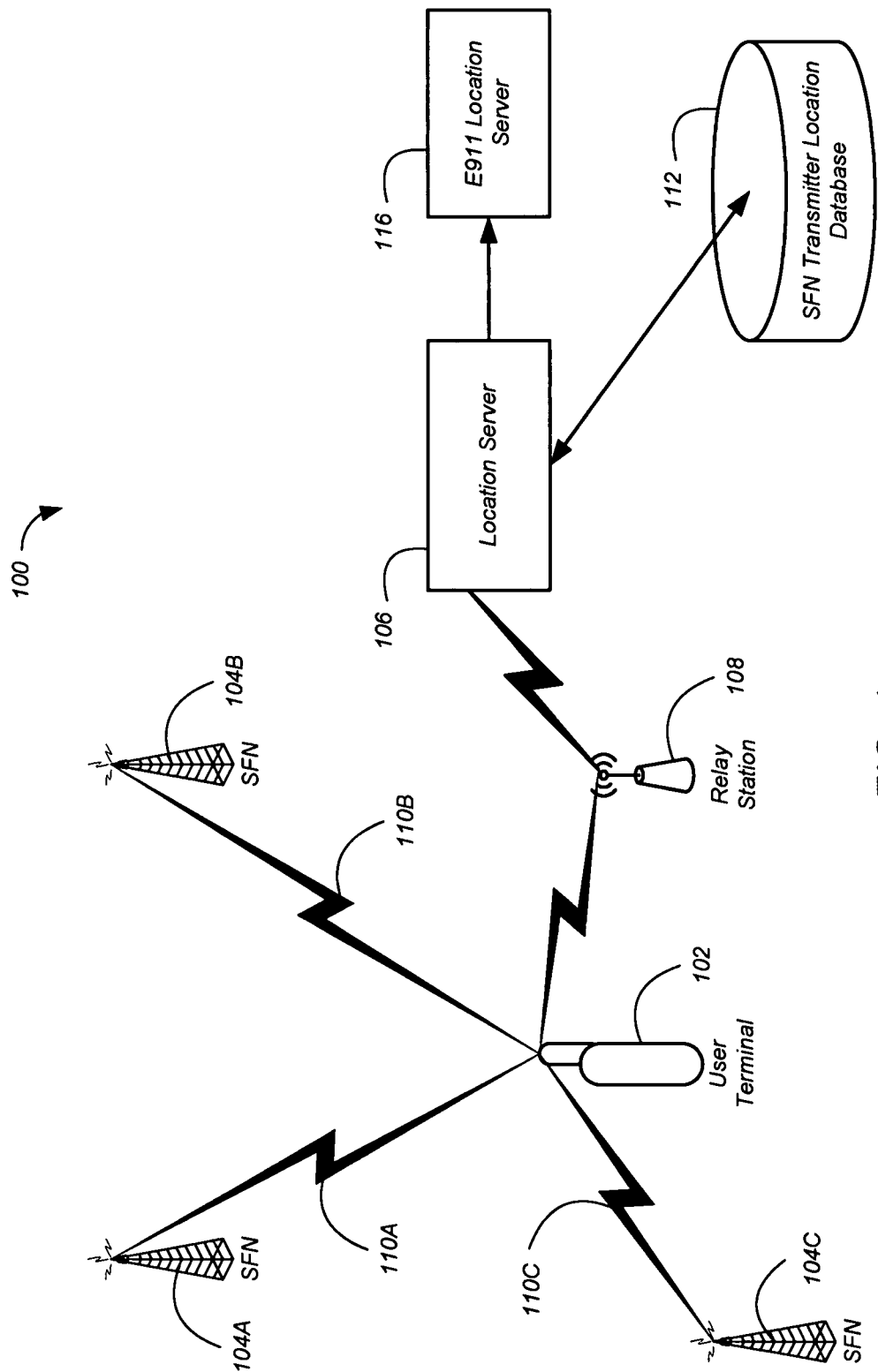
FIG. 1 shows a communication system comprising a user terminal receiving SFN signals from a plurality of respective SFN transmitters in an SFN network according to an embodiment of the present invention.

The leading digit(s) of each reference numeral used in this specification indicates the number of the drawing in which the reference numeral first appears.

DETAILED DESCRIPTION

As used herein, the terms "client" and "server" generally refer to an electronic device or mechanism, and the term "message" generally refers to an electronic signal representing a digital message. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices.

Embodiments of the present invention provide blind identification of single-frequency-network (SFN) transmitters. Various embodiments include an input module adapted to receive a plurality of pseudoranges each determined by a receiver based on one of a plurality of wireless SFN signals transmitted at a predetermined frequency from a corresponding plurality of transmitters, and a transmitter identification module adapted to identify one of the transmitters for each of the pseudoranges based on the pseudoranges and a plurality of ranges each predetermined between one of the transmitters and one of a plurality of predetermined geographic locations, also referred to herein as "survey points." Some embodiments include a location module adapted to determine a location of the receiver based on locations of the transmitters identified by the transmitter identification module and the pseudoranges.

FIG. 1 shows a communication system 100 comprising a user terminal 102 receiving SFN signals 110A-C from a plurality of respective SFN transmitters 104A-C in an SFN network according to an embodiment of the present invention. Although in the described embodiments, the elements of communication system 100 are presented in one arrangement, other embodiments may feature other arrangements, as will be apparent to one skilled in the relevant arts based on the disclosure and teachings provided herein. For example, the elements of communication system 100 can be implemented in hardware, software, or combinations thereof.

The phrase "user terminal" is meant to refer to any object capable of implementing the techniques described herein. Examples of user terminals include PDAs, mobile phones, cars and other vehicles, and any object which could include a chip or software implementing the techniques described herein. Further, the term "user terminal" is not intended to be limited to objects which are "terminals" or which are operated by "users."

In some embodiments, user terminal 102 performs the techniques described herein. In other embodiments, some or all of the techniques are performed by a location server 106 based on data collected by user terminal 102 and relayed by a relay station 108 such as a cellular base station and the like. The locations of SFN transmitters 104 can be stored in a SFN transmitter location database 112. The location of user terminal 102 can be transmitted to an E911 location server 116 for emergencies.

Figure 2:
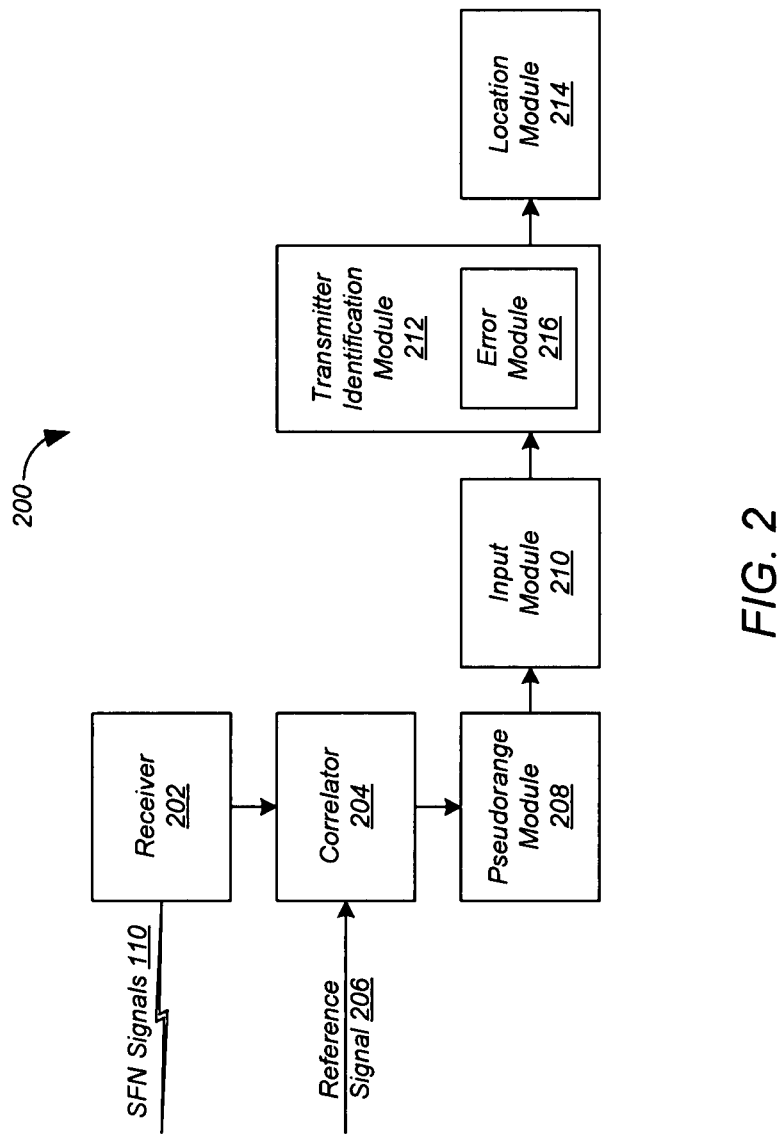
FIG. 2 shows detail of an apparatus according to an embodiment of the present invention.

FIG. 2 shows detail of an apparatus 200 according to an embodiment of the present invention. Although in the described embodiments, the elements of apparatus 200 are presented in one arrangement, other embodiments may feature other arrangements, as will be apparent to one skilled in the relevant arts based on the disclosure and teachings provided herein. For example, the elements of apparatus 200 can be implemented in hardware, software, or combinations thereof. As another example, some elements of apparatus 200 can be implemented in user terminal 102, while other elements are implemented elsewhere, for example in location server 106.

Referring to FIG. 2, apparatus 200 includes a receiver 202 adapted to receive a plurality of SFN signals 110 at a predetermined frequency, a correlator 204 adapted to correlate the SFN signals 110 with a predetermined reference signal 206 to produce a plurality of correlation peaks, a pseudorange module 208 adapted to generate a respective pseudorange based on each of the correlation peaks, an input module 210 to receive the pseudoranges from pseudorange module 208, a transmitter identification module 212 adapted to identify one of transmitters 104 for each of the pseudoranges, and a location module 214 adapted to determine a position of user terminal 102. Transmitter identification module 212 comprises an error module 216 that is described in detail below.

Figure 3:
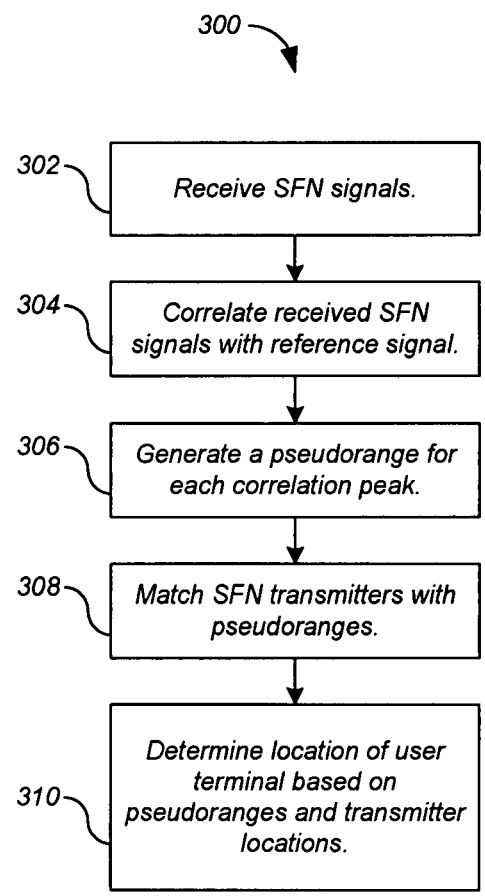
FIG. 3 shows a process for the apparatus of FIG. 2 according to an embodiment of the present invention.

FIG. 3 shows a process 300 for apparatus 200 of FIG. 2 according to an embodiment of the present invention. Although in the described embodiments, the elements of process 300 are presented in one arrangement, other embodiments may feature other arrangements, as will be apparent to one skilled in the relevant arts based on the disclosure and teachings provided herein. For example, in various embodiments, some or all of the steps of process 300 can be executed in a different order, concurrently, and the like.

Referring to FIG. 3, receiver 202 receives a plurality of SFN signals 110 at a predetermined frequency (step 302). The predetermined frequency can be selected by any means. For example, receiver 202 can receive a plurality of signals on a single 5 MHz DVB-H channel. Correlator 204 correlates received SFN signals 110 with reference signal 206 (step 304), thereby generating a series of correlation peaks. Reference signal 206 represents a repeating pattern in SFN signals 110, as is well-known in the relevant arts. In some embodiments, correlator 204 processes signals 110 in real time. In other embodiments, correlator 204 processes a previously-stored version of signals 110.

Pseudorange module 208 generates a pseudorange for each of the correlation peaks (step 306). Input module 210 receives the pseudoranges from pseudorange module 208. Transmitter identification module 212 matches SFN transmitters 104 with the pseudoranges (step 308). That is, for each pseudorange, transmitter identification module 212 identifies the SFN transmitter 104 that transmitted the SFN signal used by apparatus 200 to produce the pseudorange, as described in detail below. After the pseudoranges and transmitters have been matched, location module 214 can determine the location of user terminal 102 based on the pseudoranges and transmitter locations (step 310).

Figure 4:
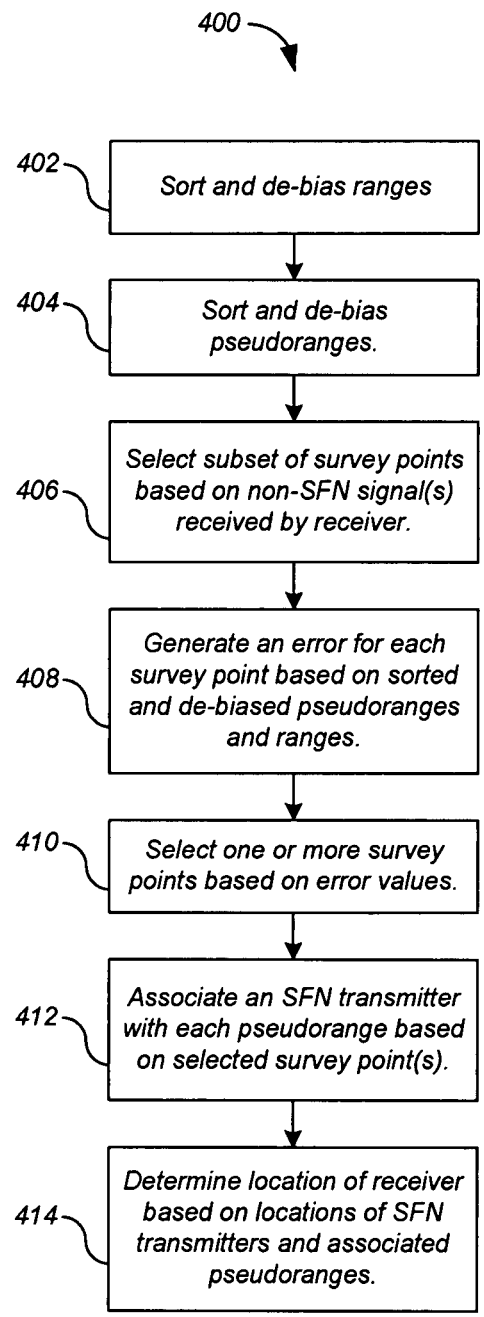
FIG. 4 shows a process for transmitter identification according to an embodiment of the present invention.

FIG. 4 shows a process 400 for transmitter identification according to an embodiment of the present invention. Although in the described embodiments, the elements of process 400 are presented in one arrangement, other embodiments may feature other arrangements, as will be apparent to one skilled in the relevant arts based on the disclosure and teachings provided herein. For example, in various embodiments, some or all of the steps of process 400 can be executed in a different order, concurrently, and the like.

Process 400 employs predetermined ranges between a plurality of predetermined survey points and SFN transmitters 104. The survey points can be selected according to any technique. For example, the survey points can be points in a grid, although any arrangement can be used.

The ranges between the selected survey points and SFN transmitters can be determined by any technique, for example such as conventional survey techniques. Each range can be a measure of the time required for an SFN signal 110 to travel from a given SFN transmitter 104 to a given survey point. The ranges can be stored for each survey point with transmitter identifiers, for example as shown in Table 1.

TABLE 1

| Location | Transmitter 1 | Transmitter 2 | ... | Transmitter M |
|---|---|---|---|---|
| Location 1 | Range 1,1 | Range 1,2 | ... | Range 1,M |
| Location 2 | Range 2,1 | Range 2,2 | ... | Range 2,M |
| ... | ... | ... | ... | ... |
| Location N | Range N,1 | Range N,2 | ... | Range N,M |

Referring to FIG. 4, process 400 sorts and de-biases the ranges (step 402). The ranges are sorted in ascending order. Then the first (that is, shortest) range is subtracted from each range. Note that the resulting first range is now zero. This subtraction has the effect of eliminating any constant systematic bias from the ranges. Of course, this step can be performed in advance to reduce the computational load on transmitter identification module 212. Process 400 also sorts and de-biases the pseudoranges (step 404), in the same manner as described for the ranges.

In some embodiments, transmitter identification module 212 reduces the search space by selecting a subset of the predetermined survey points based on one or more non-SFN signals received by receiver 202 (step 406). For example, when user terminal 102 is implemented as a mobile telephone, transmitter identification module 212 can select the subset of the survey points that fall within the cell within which the mobile telephone is currently located.

Next, for each of the survey points used, error module 216 of transmitter identification module 212 generates an error for each of the survey points based on the sorted and de-biased pseudoranges and the sorted and de-biased ranges for that survey point (step 408). In some embodiments, the error for each survey point is calculated as a sum of squared errors (SSE) between the pseudoranges and the ranges for that survey point, as shown in equation (1).

$$SSE_s = \sum_{i=2}^{N} ((d_s^{(i)} - d_s^{(1)}) - (\hat{\tau}^{(i)} - \hat{\tau}^{(1)}))^2 \quad (1)$$

where each $\hat{\tau}$ is a pseudorange determined by pseudorange module 208 based on one of SFN signals 110, each d is a range predetermined between the survey point and an SFN transmitter 104, N is the number of measurements, and the subscript s is an index of the survey points.

Transmitter identification module 212 selects one or more of the survey points based on the error values (step 410). For example, in some embodiments, transmitter identification module 212 simply selects the survey point with the lowest SSE. In other embodiments, transmitter identification module 212 selects multiple survey points with low SSE.

Based on the selected survey point(s), transmitter identification module 212 associates one of SFN transmitters 104 with each of the pseudoranges (step 412). For example, in the case of a single survey point, transmitter identification module 212 matches the pseudoranges with the ranges predetermined for the selected survey point based on their magnitudes. That is, each pseudorange is matched with the range having the value closest to that of the pseudorange. The pseudorange is then associated with the SFN transmitter 104 associated with the matched range, for example using a table such as Table 1 above. Once the pseudoranges are associated with SFN transmitters 104, location module 214 can determine a location of receiver 202 based on the locations of SFN transmitters 104 and the associated pseudoranges (step 414). Receiver position can also be inferred directly from equation (1), because it is likely the receiver is in the location with the lowest SSE.

Other non-SFN radio signals can be used to constrain the search space for process 400 of FIG. 4. These non-SFN signals can include ATSC/NTSC/PAL/SECAM TV signals, GPS, VOR, FM, DME, Loran-C, and the like. An example where the SFN measurements are augmented with two GPS satellite measurements, j and k, is now described. The GPS navigation equations are:

$$\hat{\tau}_{u,GPS}^{(j)} = d_{u,GPS}^{(j)} + B^{(j)} - b_{u,GPS} + I_{u,GPS}^{(j)} + T_{u,GPS}^{(j)} + \upsilon_{u,GPS}^{(j)}$$

$$\hat{\tau}_{u,GPS}^{(k)} = d_{u,GPS}^{(k)} + B^{(k)} - b_{u,GPS} + I_{u,GPS}^{(k)} + T_{u,GPS}^{(k)} + \upsilon_{u,GPS}^{(k)} \quad (2)$$

where $\hat{\tau}$ is pseudorange, d is true range, B is GPS clock bias, b is user clock bias, I is ionospheric delay, T is tropospheric delay and $\upsilon$ is noise. After calibrating out the GPS clock bias, the ionospheric and tropospheric delays, a TDOA representation of the equations (2) reads:

$$\hat{\tau}_{u,GPS}^{(k)} - \hat{\tau}_{u,GPS}^{(j)} = d_{u,GPS}^{(k)} - d_{u,GPS}^{(j)} + \upsilon_{u,GPS}^{(k)} - \upsilon_{u,GPS}^{(j)} \quad (3)$$

Equation (3) sets up a constraint region in the space between two hyperboloids, where the base-line thickness corresponds to the measurement uncertainty of the TDOA measurement. The resulting search space is the intersection of the original search space with the hyperboloid slice. Hybrid ranging measurements can be included in the SSE calculation of equation (1) in the following way:

$$SSE_s = \sum_{i=2}^{N_{SFN}} ((d_s^{(i)} - d_s^{(1)}) - (\hat{\tau}_{SFN}^{(i)} - \hat{\tau}_{SFN}^{(1)}))^2 + \quad (4)$$

-continued $$\sum_{j=1}^{N_{HYB}} \sum_{k=j+1}^{N_{HYB}} \left( (d_s^{(k)} - d_s^{(j)}) - (\hat{\tau}_{HYB}^{(k)} - \hat{\tau}_{HYB}^{(j)}) \right)^2$$

The techniques described above for SFN transmitter identification can be validated using the statistical tools described below. Equation (5) is a generalized navigation equation.

$$\tau_u^{(i)} = d_u^{(i)} + \alpha_u^{(i)} + \beta_u^{(i)} \quad (5)$$

Where:
τ is the measured quantity
d is the true quantity, for example range
α is a random error ~N(0,σ²)
β is a bias
The sum of squared errors (SSE) from equation 5 is given by equation (6).

$$R_u^2 = \sum_{i=1}^{N} (\tau_u^{(i)} - d_u^{(i)})^2 \quad (6)$$

$$R_u^2 = \sum_{i=1}^{N} (\alpha_u^{(i)} - \beta_u^{(i)})^2$$

Equation (7) gives the probability that the SSE at the true location (that is, the actual location of user terminal 102) is larger than that at a test point (that is, a survey point) in the search space. A small probability indicates that there is a small probability that ambiguous "truth" positions exist.

$$P(R_{grid}^2 \leq R_{true}^2) = P\left( \sum_{i=1}^{\#DVB_g} (\alpha_g^{(i)} + \beta_g^{(i)})^2 \leq \sum_{j=1}^{\#DVB_t} (\alpha_t^{(j)})^2 \right) \quad (7)$$

$$= P\left( \sum_{i=1}^{\#DVB_g} ((\alpha_g^{(i)})^2 + 2 \cdot \alpha_g^{(i)} \cdot \beta_g^{(i)} + (\beta_g^{(i)})^2) \leq \sum_{j=1}^{\#DVB_t} (\alpha_t^{(j)})^2 \right)$$

$$= P\left( \sum_{i=1}^{\#DVB_g} (\alpha_g^{(i)})^2 - \sum_{j=1}^{\#DVB_t} (\alpha_t^{(j)})^2 + 2 \cdot \sum_{i=1}^{\#DVB_g} \alpha_g^{(i)} \cdot \beta_g^{(i)} \leq - \sum_{i=1}^{\#DVB_g} (\beta_g^{(i)})^2 \right)$$

$$= P\left( \sum_{j=1}^{\#DVB_t} \left(\frac{\alpha_t^{(j)}}{\sigma}\right)^2 - \sum_{i=1}^{\#DVB_g} \left(\frac{\alpha_g^{(i)}}{\sigma}\right)^2 - 2 \cdot \sum_{i=1}^{\#DVB_g} \frac{\alpha_g^{(i)} \cdot \beta_g^{(i)}}{\sigma^2} \geq \sum_{i=1}^{\#DVB_g} \left(\frac{\beta_g^{(i)}}{\sigma}\right)^2 \right)$$

$$= 1 - P\left( \sum_{j=1}^{\#DVB_t} \left(\frac{\alpha_t^{(j)}}{\sigma}\right)^2 - \sum_{i=1}^{\#DVB_g} \left(\frac{\alpha_g^{(i)}}{\sigma}\right)^2 - 2 \cdot \sum_{i=1}^{\#DVB_g} \frac{\alpha_g^{(i)} \cdot \beta_g^{(i)}}{\sigma^2} \leq \sum_{i=1}^{\#DVB_g} \left(\frac{\beta_g^{(i)}}{\sigma}\right)^2 \right)$$

All α's are assumed to be independent of each other and identically Gaussian distributed N(0,σ²). β's are residuals between the arrivals at the true location and the arrivals at the test points in the search grid. Equation (8) breaks out and re-names the left-hand terms inside the probability in equation (7).

$$X = \sum_{j=1}^{\#DVB_t} \left(\frac{\alpha_t^{(j)}}{\sigma}\right)^2 \sim \chi^2_{\#DVB_t} \quad (8)$$

$$Y = \sum_{i=1}^{\#DVB_g} \left(\frac{\alpha_g^{(i)}}{\sigma}\right)^2 \sim \chi^2_{\#DVB_g}$$

$$Z = 2 \cdot \sum_{i=1}^{\#DVB_g} \frac{\alpha_g^{(i)} \cdot \beta_g^{(i)}}{\sigma^2} \sim N\left(0, 4 \cdot \sum_{i=1}^{\#DVB_g} \left(\frac{\beta_g^{(i)}}{\sigma}\right)^2 \right)$$

While X and Y in equation (8) are Chi-square distributed, Z is normal distributed. The right-hand term inside the probability of equation (4) is identified as a constant.

The set of variables {X,Y,Z} can be re-arranged into another set of variables {V,W,X}.

$$W = X - Y - Z$$

$$V = Y + Z$$

$$W = X - V \quad (9)$$

Using equations (7)-(9) yields:

$$P(R_g^2 \leq R_t^2) = 1 - P(X - Y - Z \leq w) \quad (10)$$

$$= 1 - P(W \leq w)$$

$$= 1 - P(X - V \leq w)$$

From equation (10) and the definition of conditional probability, it follows that $$P(X - V \leq w) = \int_{-\infty}^{\infty} P(X - V \leq w \mid X = x) \cdot f_X(x) \cdot \partial x \quad (11)$$

$$= \int_{-\infty}^{\infty} P(x - V \leq w) \cdot f_X(x) \cdot \partial x$$

$$= \int_{-\infty}^{\infty} P(-V \leq w - x) \cdot f_X(x) \cdot \partial x$$

$$= \int_{-\infty}^{\infty} P(V \geq x - w) \cdot f_X(x) \cdot \partial x$$

$$= \int_{-\infty}^{\infty} (1 - P(V \leq x - w)) \cdot f_X(x) \cdot \partial x$$

$$= \int_{-\infty}^{\infty} f_X(x) \cdot \partial x - \int_{-\infty}^{\infty} P(V \leq x - w) \cdot f_X(x) \cdot \partial x$$

$$= 1 - \int_{-\infty}^{\infty} F_V(x - w) \cdot f_X(x) \cdot \partial x$$

$F_V$ is the cumulative distribution function (CDF) of the random variable V. This CDF can be found as a function of the CDF and probability density function (PDF) of random variables Y and Z from a similar deduction to the one of equation (11). $f_X$ is the PDF of the random variable X.

Combining equations (10) and (11) yields $$P(R_g^2 \leq R_t^2) = 1 - F_W(w) \quad (12)$$

$$= 1 - \left(1 - \int_{-\infty}^{\infty} F_V(x - w) \cdot f_X(x) \cdot \partial x \right)$$

$$= \int_{-\infty}^{\infty} F_V(x - w) \cdot f_X(x) \cdot \partial x$$

While there may be no analytical solution to the integral of equation (11), the probability of equation (9) can be calculated numerically with knowledge of PDFs and CDFs of Gaussian and Chi-square distributions.

Note that the above method makes no distinction between SFN measurements and other navigation measurements. As long as the fundamental measurement adheres to the format of equation (5), any hybrid measurement source may be used.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus for blind identification of single-frequency-network (SFN) transmitters which transmit virtually identical signals from multiple points of transmission, wherein broadcasts from the SFN transmitters are synchronized, comprising:
   an input module adapted to receive a plurality of pseudoranges, each determined by a receiver based on one of a plurality of wireless SFN signals transmitted at a predetermined frequency from a corresponding plurality of transmitters;
   a transmitter identification module adapted to identify one of the transmitters for each of the pseudoranges based the pseudoranges and a plurality of ranges each predetermined between one of the transmitters and one of a plurality of predetermined geographic locations;
   wherein the transmitter identification module comprises an error module adapted to generate an error for each of the geographic locations based on the ranges for the respective geographic locations and the pseudoranges, and wherein the transmitter identification module identifies the transmitters based on the errors.

2. The apparatus of claim 1, further comprising:
   a location module adapted to determine a location of the receiver based on locations of the transmitters identified by the transmitter identification module and the pseudoranges.

3. The apparatus of claim 1:
   wherein the transmitter identification module selects a subset of the predetermined geographic locations based on one or more non-SFN signals received by the receiver; and
   wherein the transmitter identification module identifies the transmitters based on the pseudoranges, the subset of the predetermined geographic locations, and the ranges corresponding to the subset of the predetermined geographic locations.

4. The apparatus of claim 1, further comprising:
   the receiver.

5. An apparatus for blind identification of single-frequency-network (SFN) transmitters which transmit virtually identical signals from multiple points of transmission, wherein broadcasts from the SFN transmitters are synchronized comprising:
   input means for receiving a plurality of pseudoranges, each determined by a receiver based on one of a plurality of wireless SFN signals transmitted at a predetermined frequency from a corresponding plurality of transmitters; and
   transmitter identification means for identifying one of the transmitters for each of the pseudoranges based on the pseudoranges and a plurality of ranges each predetermined between one of the SFN transmitters and one of a plurality of predetermined survey points, wherein the plurality of predetermined survey points define a search space;
   wherein the apparatus is configured to perform the following acts with the transmitter identification means:
      sort and de-bias the ranges, including sorting the ranges in ascending order and subtracting the shortest range from each range;
      sort and de-bias the pseudoranges, including sorting the pseudoranges in ascending order and subtracting the shortest pseudorange from each pseudorange;
      reduce the search space by selecting a subset of the predetermined survey points;
      generate an error for each survey point in the reduced search space based on the sorted and de-biased pseudoranges and the sorted and de-biased ranges for that survey point; and
      associate an SFN transmitter with each pseudorange, wherein associating an SFN transmitter with each pseudorange comprises matching each pseudorange with the range having the value closest to that of the pseudorange, and wherein the pseudorange is then associated with the SFN transmitter associated with the matched range.

6. The apparatus of claim 5, further comprising:
   location means for determining a location of the receiver based on locations of the transmitters identified by the transmitter identification means and the pseudoranges.

7. The apparatus of claim 5:
   wherein the transmitter identification means selects a subset of the predetermined survey points based on one or more non-SFN signals received by the receiver; and
   wherein the transmitter identification means identifies the transmitters based on the pseudoranges, the subset of the predetermined survey points, and the ranges corresponding to the subset of the predetermined survey points.

8. The apparatus of claim 5, further comprising:
the receiver.

9. A method for blind identification of single-frequency-network (SFN) transmitters which transmit virtually identical signals from multiple points of transmission, wherein broadcasts from the SFN transmitters are synchronized, comprising:
receiving a plurality of pseudoranges, each determined by a receiver based on one of a plurality of SFN signals transmitted at a predetermined frequency from a corresponding plurality of transmitters; and
identifying one of the transmitters for each of the pseudoranges based on the pseudoranges and a plurality of ranges each predetermined between one of the transmitters and one of a plurality of predetermined survey points;
wherein the following acts are carried out using a transmitter identification module:
sort and de-bias the ranges, including sorting the ranges in ascending order and subtracting the shortest range from each range;
sort and de-bias the pseudoranges, including sorting the pseudoranges in ascending order and subtracting the shortest pseudorange from each pseudorange;
reduce the search space by selecting a subset of the predetermined survey points;
generate an error for each survey point in the reduced search space based on the sorted and de-biased pseudoranges and the sorted and de-biased ranges for that survey point; and
associate an SFN transmitter with each pseudorange, wherein associating an SFN transmitter with each pseudorange comprises matching each pseudorange with the range having the value closest to that of the pseudorange, and wherein the pseudorange is then associated with the SFN transmitter associated with the matched range.

10. The method of claim 9, further comprising:
determining a location of the receiver based on locations of the transmitters and the pseudoranges.

11. The method of claim 9, wherein the method further comprises:
selecting a subset of the predetermined survey points based on one or more non-SFN signals received by the receiver; and
identifying the transmitters based on the pseudoranges, the subset of the predetermined survey points, and the ranges corresponding to the subset of the predetermined survey points.

12. The method of claim 9, further comprising:
receiving the wireless SFN signals.

13. Computer-readable non-transitory media embodying instructions executable by a computer to perform a method for blind identification of single-frequency-network (SFN) transmitters which transmit virtually identical signals from multiple points of transmission, wherein broadcasts from the SFN transmitters are synchronized, comprising:
receiving a plurality of pseudoranges, each determined by a receiver based on one of a plurality of wireless SFN signals transmitted at a predetermined frequency from a corresponding plurality of transmitters; and
identifying one of the transmitters for each of the pseudoranges based on the pseudoranges and a plurality of ranges each predetermined between one of the transmitters and one of a plurality of predetermined geographic locations;
wherein the following acts are carried out using a transmitter identification module: sort and de-bias the ranges, including sorting the ranges in ascending order and subtracting the shortest range from each range;
sort and de-bias the pseudoranges, including sorting the pseudoranges in ascending order and subtracting the shortest pseudorange from each pseudorange;
reduce the search space by selecting a subset of the predetermined geographic locations;
generate an error for each geographic location in the reduced search space based on the sorted and de-biased pseudoranges and the sorted and de-biased ranges for that geographic location; and
associate an SFN transmitter with each pseudorange, wherein associating an SFN transmitter with each pseudorange comprises matching each pseudorange with the range having the value closest to that of the pseudorange, and wherein the pseudorange is then associated with the SFN transmitter associated with the matched range.

14. The computer-readable non-transitory media of claim 13, wherein the method further comprises:
determining a location of the receiver based on locations of the transmitters and the pseudoranges.

15. The computer-readable non-transitory media of claim 13, wherein the method further comprises:
selecting a subset of the predetermined geographic locations based on one or more non-SFN signals received by the receiver; and
identifying the transmitters based on the pseudoranges, the subset of the predetermined geographic locations, and the ranges corresponding to the subset of the predetermined geographic locations.

16. The computer-readable non-transitory media of claim 13, wherein the method further comprises:
receiving the wireless SFN signals.

* * * * *